United States Patent
Hazlewood et al.

(10) Patent No.: US 8,862,874 B2
(45) Date of Patent: Oct. 14, 2014

(54) CERTIFICATE DISTRIBUTION USING SECURE HANDSHAKE

(75) Inventors: Kristin Marie Hazlewood, Austin, TX (US); Annemarie Rose Fitterer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 12/117,810

(22) Filed: May 9, 2008

(65) Prior Publication Data
US 2009/0327708 A1      Dec. 31, 2009

(51) Int. Cl.
H04L 29/06    (2006.01)
H04L 9/00     (2006.01)
H04L 9/32     (2006.01)

(52) U.S. Cl.
CPC .......... *H04L 9/3268* (2013.01); *H04L 63/0823* (2013.01); *H04L 2209/80* (2013.01); *H04L 9/3271* (2013.01)
USPC .......................................... 713/158; 713/156

(58) Field of Classification Search
USPC ................................. 713/156, 158
See application file for complete search history.

(56) References Cited

U.S. PATENT DOCUMENTS

| | | | |
|---|---|---|---|
| 6,128,740 A | 10/2000 | Curry et al. | |
| 6,339,827 B1 | 1/2002 | Stokes et al. | |
| 6,931,528 B1 * | 8/2005 | Immonen | 713/151 |
| 7,730,145 B1 * | 6/2010 | Frenkel et al. | 709/206 |
| 8,032,743 B2 * | 10/2011 | Asay et al. | 713/156 |
| 8,214,638 B1 * | 7/2012 | Karp et al. | 713/157 |
| 2003/0105955 A1 | 6/2003 | Carroll et al. | |
| 2004/0003235 A1 | 1/2004 | Musa | |
| 2004/0171369 A1 * | 9/2004 | Little et al. | 455/410 |
| 2004/0193872 A1 | 9/2004 | Saarepera et al. | |
| 2005/0071630 A1 * | 3/2005 | Thornton et al. | 713/156 |
| 2005/0071631 A1 | 3/2005 | Langer | |
| 2005/0108531 A1 * | 5/2005 | Swander et al. | 713/171 |
| 2005/0188196 A1 * | 8/2005 | Kakii | 713/156 |
| 2005/0278534 A1 * | 12/2005 | Nadalin et al. | 713/175 |
| 2006/0047951 A1 | 3/2006 | Reilly et al. | |
| 2006/0047965 A1 | 3/2006 | Thayer | |
| 2009/0144540 A1 | 6/2009 | Davis et al. | |

* cited by examiner

*Primary Examiner* — Jung Kim
*Assistant Examiner* — Ali Shayanfar
(74) *Attorney, Agent, or Firm* — Garg Law Firm, PLLC; Rakesh Garg; Jeffrey S. LaBaw

(57) ABSTRACT

A method, system, and computer usable program product for certificate distribution using a secure handshake are provided in the illustrative embodiments. A client sends an indication in a request, the request being a part of a secure data communication with a server. The indication indicates an ability of the client to accept a certificate as a part of a response from the server. The server retrieves a new certificate. The server sends as a result of the indication, a new certificate in the response corresponding to the request. The client receives as a result of the indication, the new certificate in a response that corresponds to the request. The client separates the new certificate from the response and uses the new certificate in the secure data communication with the server. The server uses the new certificate in the secure data communication with the client.

18 Claims, 4 Drawing Sheets

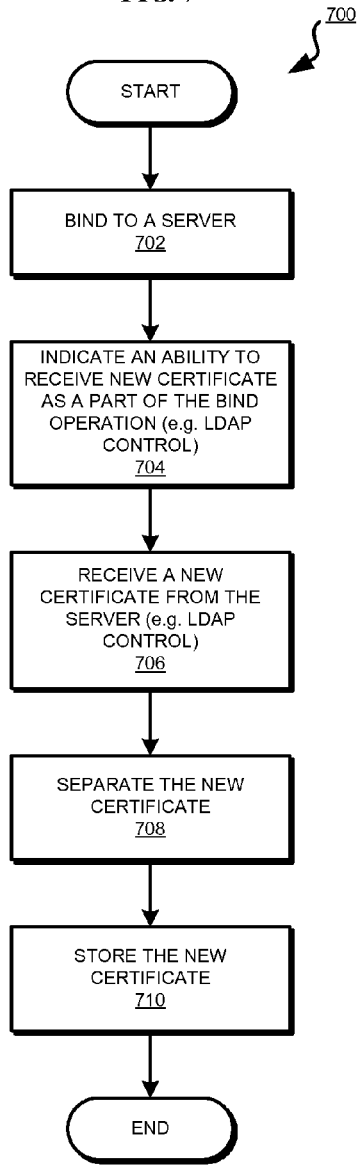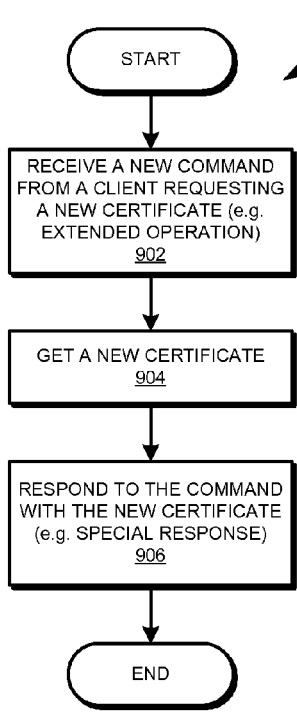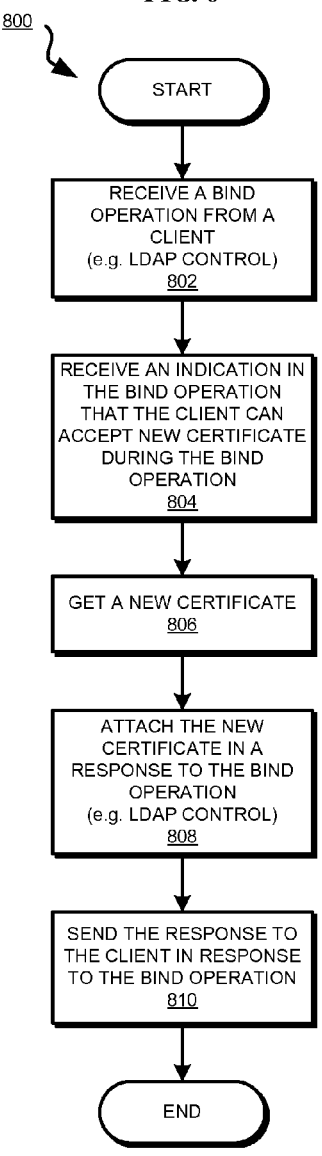
*FIG. 7*
*FIG. 9*
*FIG. 8*

CERTIFICATE DISTRIBUTION USING SECURE HANDSHAKE

RELATED APPLICATION

The present invention is related to similar subject matter of and commonly assigned U.S. patent application Ser. No. 12/117,031 entitled "CERTIFICATE RENEWAL USING SECURE HANDSHAKE," filed on May 08, 2008, which is hereby incorporated by reference.

BACKGROUND OF THE INVENTION

1. Field of the Invention

The present invention relates generally to an improved data processing system, and in particular, to a computer implemented method for managing security in a data processing system. Still more particularly, the present invention relates to a computer implemented method, system, and computer usable program code for certificate distribution using a secure handshake.

2. Description of the Related Art

Applications executing on different data processing systems communicate with each other over data networks. Some of these data communications may have to include certain security mechanisms, such as encryption or digital signatures, to ensure that the data contained in the communication is hidden or not readable while in transit.

Encryption is the process of transforming information referred to as plaintext, using an algorithm called cipher, to make the plaintext unreadable to anyone except those possessing special knowledge, usually referred to as a key. The result of this process is encrypted information, which, in cryptography, is referred to as ciphertext. The detailed operation of a cipher is controlled both by the algorithm and the key.

In some other data communications, security mechanisms based on encryption may prevent repudiation of the communication by one or both parties, such as by using digital signatures. A digital signature provides a method of authenticating the author of a message or communication based on the digital signature of that message, in a manner analogous to a handwritten signature. A digital signature may also be used to prove that a message has not been modified since it was initially signed.

In some data communications, the security mechanism is designed to ensure the identity of the data processing systems on each end of the data communication. The security mechanism may also include and encrypting the data communication between the two communicating systems. Solutions based on public key cryptography are commonly used for these purposes in data communications.

A public key cryptography solution uses two "keys", a public key and a private key, referred to as a "key pair", as a part of the mathematical transformation applied to a message. These keys are related in a manner such that when a ciphertext message created with a particular algorithm and one of the keys is processed with the corresponding algorithms and the other key of the key pair, the original message is revealed.

Further, in solutions for secured data communications, a "digital certificate" is used to associate an identity, such as an identity of the user, or of a data process system, with one half of the key pair—the "public" key. In this process, a message is signed with a "private" key that is known only to the entity signing the message. The signed message is then transmitted, optionally with the digital certificate, so that the recipient can validate the signature. Using the signature in this manner, the recipient verifies that the message was signed by the entity identified in the digital certificate.

A digital certificate is also known simply as a certificate. Usually, a certificate is "signed" by a trusted third party, such as the issuer of the certificate called a certificate authority (CA). By signing a certificate, a certificate authority attests to the identity of the holder of the certificate to some degree.

Certificates can be assigned to software applications as well as data processing systems. Software applications and data processing systems can use the certificates and the keys bound to the certificates for authentication, encryption, non-repudiation, and other uses.

One use of public key cryptography and certificates is in secure sockets layer (SSL) communication and transport layer security (TLS). SSL communication is a secure method of communicating private information over public networks, such as over the Internet. In SSL communication, one system, called the client, requests a secure communication with another system, called the server. The client and the server negotiate a cipher to use for the communication. The server then signs a message using this cipher and presents its certificate together with this message, which authenticates the server and provides the server's public key to the client. The client generates a random number to be used as a key for the secure communication session. The random number is called a session key. The client encrypts the session key using the server's public key from the server's certificate and sends to the server. The server decrypts the encrypted session key using its private key and obtains the session key to use in the secure communication session with the client.

This and other similar approaches can be used to validate the identity of communicating parties, based on the encryption of messages or information, and subsequent message communication or information exchange together with the certificate. In some implementations, this overall process may be modified by not exchanging the digital certificate with every message/information exchange, instead relying on the receiving party having a copy of the certificate, or having the ability to retrieve the certificate.

SUMMARY OF THE INVENTION

The illustrative embodiments provide a method, system, and computer usable program product for certificate distribution using a secure handshake. A client sends an indication in a request, the request being a part of a secure data communication with a server. The indication indicates an ability of the client to accept a certificate as a part of a response from the server. The client receives as a result of the indication, a new certificate in a response that corresponds to the request. The client separates the new certificate from the response and uses the new certificate in the secure data communication with the server.

A server receives an indication in a request from a client, the request being a part of a secure data communication with the client. The indication indicates an ability of the client to accept a certificate as a part of a response. The server retrieves a new certificate. The server sends as a result of the indication, the new certificate in the response corresponding to the request. The server uses the new certificate in the secure data communication with the client.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 7 depicts a flowchart of a process of indicating in an LDAP request the ability to receive a certificate in accordance with an illustrative embodiment;

FIG. 8 depicts a flowchart of a process of using an indication in a request to distribute a certificate in accordance with an illustrative embodiment; and FIG. 9 depicts a flowchart of a process of distributing a certificate in a directory environment in accordance with an illustrative embodiment.

DETAILED DESCRIPTION OF THE PREFERRED EMBODIMENT

Figure 1:
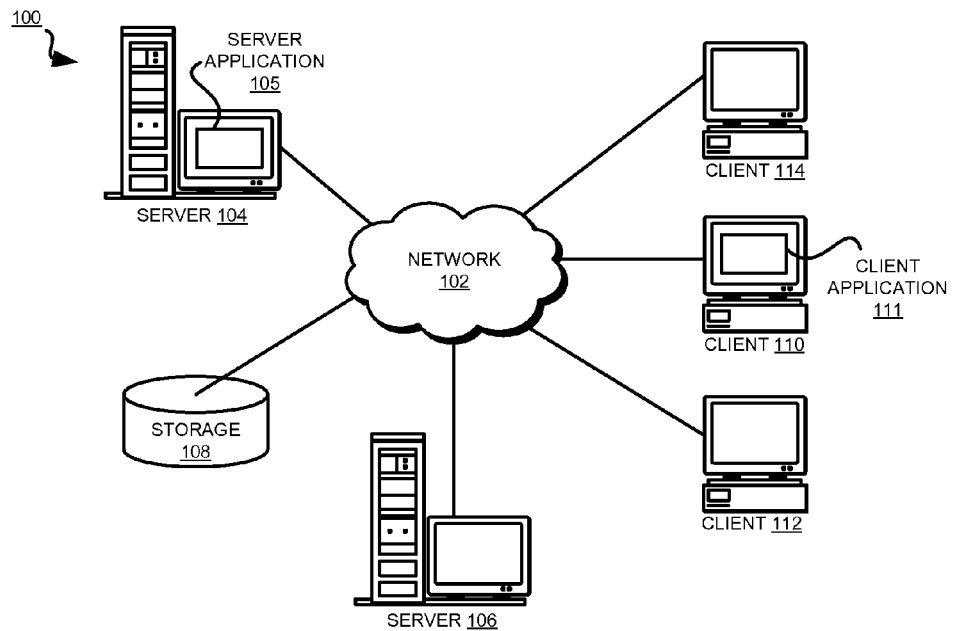
FIG. 1 depicts a pictorial representation of a network of data processing systems in which illustrative embodiments may be implemented.

TLS is a new version of the security protocol that may replace SSL in the future. There are differences between TLS and SSL specifications and implementations. However, TLS and SSL are similar to one another and interchangeably usable for the purpose of the illustrative embodiments described in this disclosure.

When an application receives a certificate in response to a request for an SSL communication, the application can perform several steps to verify whether the certificate is valid. Verifying validity of a certificate may include verifying various aspects of a certificate. As an example, in validating a certificate, an application may process the certificate using a root certificate of the certificate authority who signed the certificate. A root certificate is a certificate of a certificate authority. The root certificate can be stored in a certificate repository of the application. The root certificate can be used for verifying that the certificate authority trusts the holder of the certificate, such as a server presenting a server certificate.

A step in verifying the validity of a certificate is ensuring that the holder of the certificate is presenting the certificate within a validity period of the certificate. A validity period of a certificate is a duration, usually from a start date to an end date, within which the holder of the certificate can use the certificate for secure communication, such as over SSL or TLS. Illustrative embodiments recognize that in some cases, an application may use a certificate that is within a predetermined period from the end date of the certificate's validity period. Illustrative embodiments further recognize that in some other cases, an application may present a certificate whose validity period has expired.

Illustrative embodiments recognize that in data processing environments certificate maintenance is a labor intensive, personnel dependent, and error prone process. For example, when a certificate associated with a server data processing system expires or nears expiry, a user has to detect this condition. The user then has to generate a new certificate or request a new certificate from a certificate authority. The user then has to force a communication from the server to many client applications and data processing systems informing those clients that a new server certificate is replacing the existing server certificate.

Additionally, once a new certificate is available, the user has to take an action to remove the expired or expiring certificate from the server's certificate repository. Furthermore, the user has to take an action, or force the server to take an action, to remove the expired or expiring certificate from the certificate repositories of several clients.

Illustrative embodiments also recognize that an organization may have to replace one or more certificates for other reasons. For example, when a system administrator leaves the organization to become employed by a competitor of the organization, the organization may determine that the system administrator's departure warrants replacing the certificates of which the system administrator may have had copies or other information.

As another example, a certificate may be compromised, such as when an intruder gains access to a certificate repository. Upon detecting a security breach as in this example, an organization may wish to replace one or more certificates that may have been stored in the certificate repository.

In these and other similar circumstances, a certificate may have to be renewed, replaced, and distributed to maintain the integrity of the secure communications. For these purposes a replacement of a certificate may be forced. For example, a certificate may be forced to expire or the certificate may be revoked.

Illustrative embodiments recognize that managing certificate expiration can be tedious and error prone process. For example, depending on the number of clients and servers, the number of data processing systems involved in secured communication with one another, and the number of certificates in use for such secured communications, a user may spend many hours over many days performing the certificate management task. Even then, the user may forget to replace an expired certificate in a particular data processing system causing a secured communication to fail in the future.

To address these and other problems related to certificate distribution, the illustrative embodiments provide a method, system, and computer usable program product for certificate distribution using a secure handshake. In this disclosure, "expired certificate" collectively refers to an expired certificate as well as an expiring certificate. In other words, "expired certificate" refers to a certificate whose end date of validity has passed as well as to a certificate whose end date of validity is within a predetermined period from the date or time the certificate is presented for a secure data communication. "Expired certificate" also includes certificates that are replaced, in other words, certificates that are revoked or forced to expire.

Using the illustrative embodiments, an implementation may be able to distribute a new certificate from one system to any number of other systems automatically or without user intervention. In one embodiment, a system may distribute a new certificate on demand by other systems. In another embodiment, a system may distribute a new certificate upon an indication from another system that the other system is willing or able to accept a new certificate. A system distributing a new certificate or a system receiving a new certificate in this manner may be a data processing system or one of its components, a software application or one of its components, or a combination thereof.

Furthermore, a particular implementation may use the illustrative embodiments in conjunction with any application or any data processing system that uses certificates for secure data communications, including but not limited to SSL communication or TLS communication. For example, an implementation may use the illustrative embodiments with a directory server, a name server, a user location service server (ULS server), an application server, a web server, a proxy server, a mail server, a feed server, or any other type of data server. Another implementation may use the illustrative embodiments with a business application, enterprise software, and middleware application or platform.

Furthermore, an implementation may use the illustrative embodiments in conjunction with a variety of communication protocols, such as lightweight directory access protocol (LDAP), hypertext transport protocol (HTTP), and any other data communication protocol that may accommodate various aspects of the illustrative embodiments. Additionally, an implementation may implement the illustrative embodiments in conjunction with a hardware component, such as in a firmware, as embedded software in a hardware device, or in any other suitable hardware or software form.

Any advantages listed herein are only examples and are not limiting on the illustrative embodiments. A particular embodiment may have some, all, or none of the advantages listed above. Furthermore, specific embodiments may realize additional or different advantages. Such additional or different advantages are contemplated within the scope of the illustrative embodiments.

Figure 2:
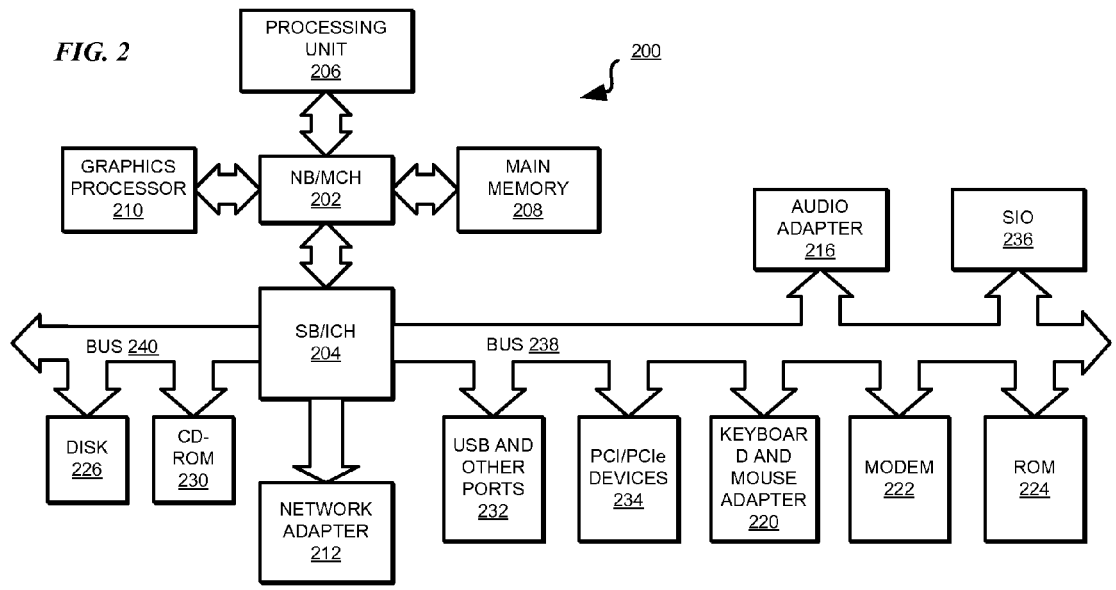
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes server application 105, which may be an example of a software application, in conjunction with which the illustrative embodiments may be implemented. Client 110 may include client application 111, which may engage in a secure data communication with server application 105.

In addition, clients 110, 112, and 114 couple to network 102. Any of clients 110, 112, and 114 may have an application, typically a client application, executing thereon. As an example, client 112 is depicted to have browser 113 executing thereon. Browser 113 may be a commonly used web-browser.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
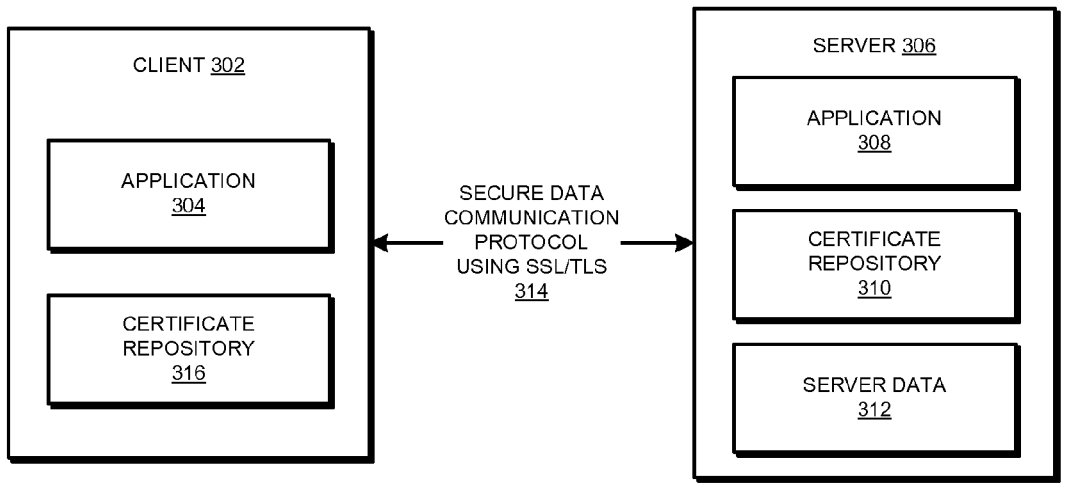
FIG. 3 depicts a block diagram of a secure data communication in which the illustrative embodiments may be implemented.

With reference to FIG. 3, this figure depicts a block diagram of a secure data communication in which the illustrative embodiments may be implemented. Client 302 and application 304 may be implemented using client 110 and client application 111 respectively in FIG. 1. Server 306 and application 308 may be implemented using server 104 and server application 105 respectively in FIG. 1.

Server 306 may further include certificate repository 310, where application 308 may read, write, or manipulate certificates. Application 308 may serve data from server data 312 to application 304 over secure data communication 314 using a certificate from certificate repository 310. Application 304 may similarly read, write, or manipulate the certificate received from application 310 in certificate repository 316.

Secure data communication 314 may use any protocol capable of using a secure form of data communication, such as SSL or TLS. For example, LDAP over SSL or TLS may be one such protocol used in secure data communication 314. HTTPS, which is a secure form of HTTP utilizing SSL, may be another example of a protocol used in secure data communication 314.

A client may request a secure data communication with a server beginning with a handshake. A handshake is an exchange of one or more messages or communications between the client and the server so that the two systems come to terms on parameters to use for the subsequent secure communication. A handshake is also called a secure handshake.

For example, in an SSL based communication, negotiating a cipher to use for the communication, the server presenting its certificate, and the client generating and sending a session key to the server are parts of a secure handshake. A secure data communication follows a successful secure handshake. A successful secure handshake is a secure handshake where the client and the server are able to agree on the parameters of the secure data communication.

For example, in a secure handshake for an SSL based secure data communication, the secure handshake is successful when the client and the server agree on the cipher, the client accepts the server's certificate, and the server accepts the session key. Accepting a certificate includes validating a certificate. Validating a certificate includes determining whether the certificate is within a predetermined period from the end date of the certificate's validity period.

A secure handshake where only one of the two engaged parties presents a certificate is also known as a one-way handshake or a one-way secure handshake. In some cases, the secure handshake may include the client presenting its certificate to the server and the server accepting the client certificate as well. This type of secure handshake is known as a two-way handshake or a two-way secure handshake. In systems for secure data communications that use two-way secure handshakes, the secure data communication follows a successful two-way secure handshake. For example, in a two-way secure handshake for an SSL based secure data communication, the two-way secure handshake is successful when the client and the server agree on the cipher, the client accepts the server's certificate, the server accepts the client's certificate, and the server accepts the session key.

Application 308 may present a server certificate to application 304 in a secure handshake in the course of establishing secure data communication 314. In addition, application 304 may present a client certificate to application 308 in a two-way secure handshake in the course of establishing secure data communication 314.

Figure 4:
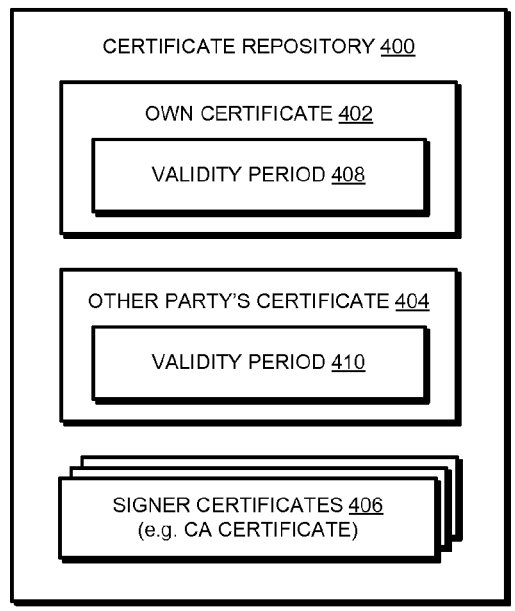
FIG. 4 depicts a block diagram of a certificate repository in accordance with an illustrative embodiment.

With reference to FIG. 4, this figure depicts a block diagram of a certificate repository in accordance with an illustrative embodiment. Certificate repository 400 may be implemented using any of certificate repositories 310 or 316 in FIG. 3.

An application, such as application 304 or application 308 in FIG. 3, may use certificate repository 400 for reading, writing, or manipulating certificates. For example, a client application may store its own certificate, own certificate 402, in certificate repository 400. Certificate repository 400 may also be usable for storing other parties' certificates, such as other party's certificate 404. For example, a client may store as other party's certificate 404 a server's certificate that the client receives during a secure handshake. Certificate repository 400 may further include one or more signer certificates 406, which may be root certificates for one or more certificate authorities.

Associated with each certificate is a validity period, usually specified as a start data and an end date. Own certificate 402 includes validity period 408. Other party's certificate 404 includes validity period 410. A certificate in signer certificates 406 may also include a validity period, although a signer's certificate can be perpetually valid by having no end date or an end date far into the future.

In accordance with an illustrative embodiment, in accepting a certificate, an application may determine whether the certificate has expired or is expiring by using the validity period associated with the certificate. The application may be a server application accepting a client's certificate, or a client application accepting a server's certificate. For example, the application may determine that the certificate has already expired, or is expiring within a predetermined period from the end date of the certificate's validity period.

If the application determines that the certificate is expiring or has expired in this manner, the application may not accept the certificate. In one embodiment, the application may accept an expiring certificate in conjunction with additional steps as described with respect to some illustrative embodiments below. In another embodiment, the application may perform additional steps as described with respect to some illustrative embodiments below, when presented with an expired or expiring certificate.

Figure 5:
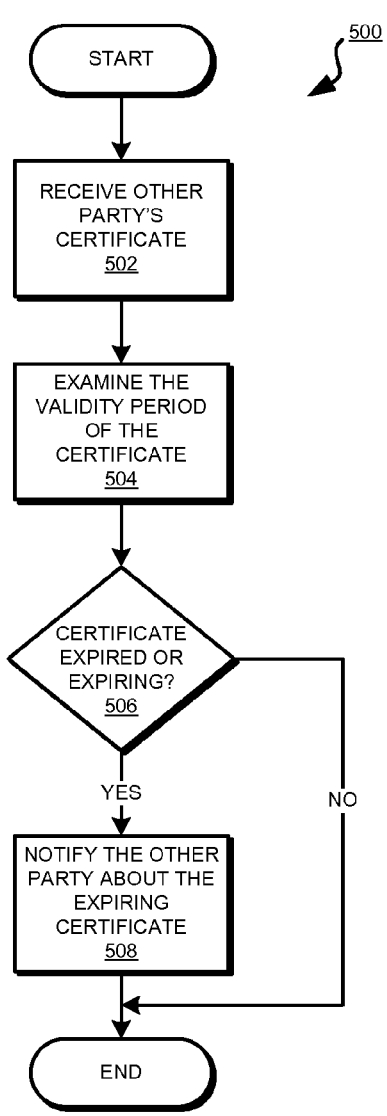
FIG. 5 depicts a flowchart of a process of notifying about a certificate expiration in accordance with an illustrative embodiment.

With reference to FIG. 5, this figure depicts a flowchart of a process of notifying about a certificate expiration in accordance with an illustrative embodiment. Process 500 may be implemented in an application, such as any of applications 304 and 308 in FIG. 3. In one embodiment, process 500 may be implemented in a certificate repository, such as certificate repository 400 in FIG. 4. In another embodiment, process 500 may be implemented in a combination of an application and a certificate repository.

Process 500 begins by receiving a certificate from a party to a secure data communication (step 502). Process 500 examines the validity period of the certificate received in step 502 (step 504). Process 500 determines if the certificate has already expired or is expiring within a predetermined period (step 506).

If the certificate has already expired or is expiring ("Yes" path of step 506), process 500 notifies the party about the expiration (step 508). Process 500 ends thereafter. If the certificate has not already expired or is not expiring within a predetermined period ("No" path of step 506), process 500 ends as well.

In step 506, process 500 may also determine if the certificate has been revoked, or flagged for revocation. In making this determination, process 500 may check for expiration as well as revocation. For example, an organization may own a server that presents a certificate. A system administrator in the organization may leave the employment of the organization o create a possibility of a breach of security or a possibility of compromising the certificate. The organization may revoke the certificate or ask a certificate authority to revoke the certificate. The organization, the server, the certificate authority, or a combination thereof may also set an indication, such as in a certificate repository, that the certificate should not be accepted as valid. Setting such an indication is flagging for revocation.

If step 506 determines that the certificate has been revoked or flagged for revocation, process 500 may perform an action similar to the action shown as the "Yes" path of step 506. In step 508, process 500 may notify the holder of the certificate received in step 502 that the certificate has already expired or is expiring within a predetermined time period.

In one embodiment, the holder of the certificate may renew the certificate upon receiving the notification. In another embodiment, process 500 may include additional steps for renewing the certificate on the holder's behalf. In another embodiment, process 500 may employ one notification or renewal process if process 500 determines that the certificate has been revoked, and a different notification or renewal process if the certificate is flagged for revocation. For example, process 500 may notify not only the holder of the certificate but also other clients, applications, servers, or systems, that the certificate has been revoked. For such certificates, an implementation may not allow process 500 to renew the certificate.

Furthermore, the notification may take any form suitable for a particular implementation. For example, a directory client application may notify a directory server that the server's certificate is expiring in three days. The directory client may notify the directory server by invoking an extended operation or by sending a control in a LDAP request or command.

As another example, a directory client may present its certificate to a directory server in a two-way secure handshake. The directory server may detect that the directory client's certificate is expiring within two weeks. The directory server may notify the directory client about the expiration in an LDAP response. The directory server may notify the client by using a control in an LDAP response.

An extended operation is an operation or a function that can be performed with respect to a directory. Typically, an extended operation is implemented as code that can execute in conjunction with a directory and perform that function or operation on the directory. In some instances, the extended operation may accept a request or a command, execute the request or command on the directory, and return data as a response. In some instances, executing an extended operation may also result in information being recorded, a directory being manipulated, or other action.

A control, also called an LDAP control, is a parameter specified in a request to a directory. The directory includes code that may interpret the parameter, the control, and take a predetermined action on the directory. In some instances, including a control in a request or command may result in a response being sent to the sender of the control, a response including certain data, information being recorded, a directory being manipulated, or other action.

A control may also be specified in a response from a directory, such as to a directory client. Including a control in a response may result in the client receiving information, such as a certificate, or the client taking an action. For example, a control may indicate to the client that the response includes a certificate, enabling the client to find and separate the certificate from the response data.

As another example in accordance with an illustrative embodiment, a client application, such as a web browser, may notify a web server that the server's certificate is expired or expiring by including a parameter in a HTTPS request. The parameter included in the HTTPS request may operate analogous to the control in the LDAP request described above. For example, the parameter may notify the web server about the server certificate expiration in accordance with an illustrative embodiment.

The extended operation, the LDAP control, and the HTTPS parameter are all described only as examples for the clarity of the description and are not limiting on the illustrative embodiments. Requests and responses in many other protocols may be similarly modified to communicate from one application to another a notification of certificate expiry without departing from the scope of the illustrative embodiments. Furthermore, a communication in a protocol may be modified in accordance with an illustrative embodiment such that a client may notify a server about the server's certificate, or a server may notify a client about the client's certificate in this manner.

Figure 6:
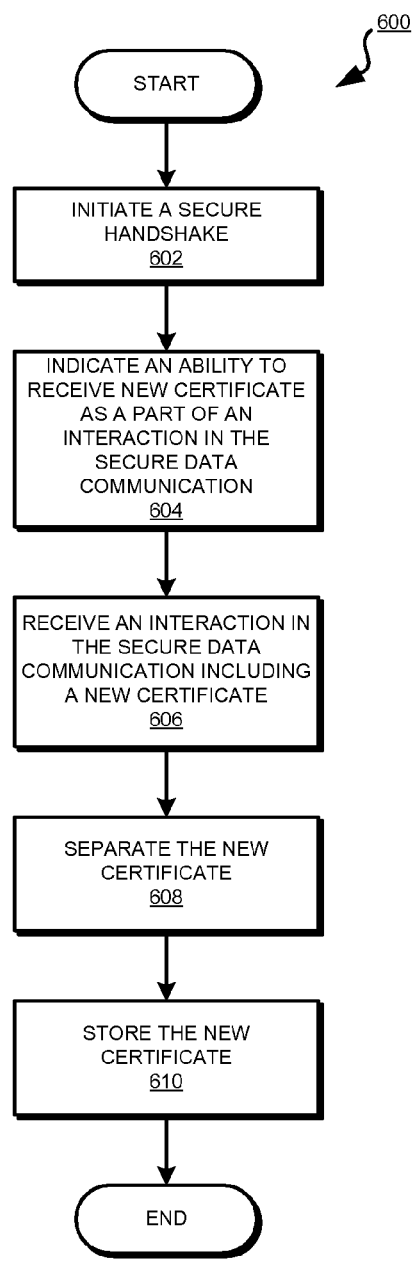
FIG. 6 depicts a flowchart of a process of receiving a certificate being distributed in accordance with an illustrative embodiment.

With reference to FIG. 6, this figure depicts a flowchart of a process of receiving a certificate being distributed in accordance with an illustrative embodiment. Process 600 may be implemented in an application, such as application 304 in FIG. 3. In one embodiment, process 600 may be implemented in a certificate repository, such as certificate repository 316 in FIG. 3.

Process 600 begins by initiating a secure handshake (step 602). Process 600 indicates an ability to receive new certificate as a part of an interaction in the secure data communication (step 604).

For example, a browser client may send a parameter in an HTTP request to a web server. Using the parameter, the browser client may indicate to the web server that the browser client can accept a new certificate as a part of an HTTP response. A web server receiving such a parameter from a browser client may determine that the browser client can accept certificates, such as a renewed server certificate, as a part of the HTTP response. The web server may then prepare a response according the client's request, include the web server's certificate in the response, and send the response to the browser client.

In one embodiment, the sender of the indication, such as the client, may also indicate a form in which the sender expects the certificate to be present in the response. For example, the sender may want the certificate portion of the response encoded differently from the rest of the response.

In another embodiment, the sender may indicate a location where the sender expects the certificate to be present in the response. For example, the sender may specify a byte offset at which the sender expects the certificate in the response. As another example, the sender may specify a tag or an identifier that the sender expects to precede the certificate in the response.

Responsive to sending the indication in step 604, process 600 receives an interaction in the secure data communication including a new certificate (step 606). For example, the interaction may be an HTTP response including a certificate at a designated location in the HTTP response. Note that the new certificate may be a certificate generated by a self certifying system, a certificate newly provided by a certificate authority, a renewed certificate, or a preexisting certificate.

Process 600 separates the new certificate from the response (step 608). Process 600 stores the new certificate, such as in a certificate repository (step 610). Process 600 ends thereafter. In one embodiment, process 600 may use the new certificate for the secure data communication instead of, or in addition to, storing the new certificate in step 610.

With reference to FIG. 7, this figure depicts a flowchart of a process of indicating in an LDAP request the ability to receive a certificate in accordance with an illustrative embodiment. Process 700 may be implemented in an application, such as application 304 in FIG. 3. In one embodiment, process 700 may be implemented in a certificate repository, such as certificate repository 316 in FIG. 3.

Process 700 begins by initiating a bind operation with a directory server (step 702). A bind operation with a server is a process of presenting authentication to the server. For example, a directory client wanting to gain access to a directory server's data has to bind with the directory server. In other words, the directory client has to present the client's authentication credentials, such as a login and password, a certificate, or some other form of authentication credential, to the directory server before the directory server will respond to requests from the client.

Process 700 indicates an ability to receive new certificate as a part of the bind operation (step 704). For example, a directory client may send a control in an LDAP request to a directory. Using the control, the directory client may indicate to the directory server that the directory client can accept a new certificate as a part of an LDAP response. A directory server receiving such a control from a directory client may determine that the directory client can accept certificates, such as a renewed server certificate, included as a part of the LDAP response. The directory server may then prepare a response according the client's request, include the directory server's certificate in the response, and send the response to the directory client.

The LDAP request including the control may be a bind operation and the LDAP response including the certificate may be a response to the bind operation. Furthermore, the directory client may also specify a location, form, or identifier of the certificate in the response as described above.

Responsive to sending the control in step 704, process 700 receives a response including a new certificate (step 606). For example, the LDAP response may include a new directory server certificate as a control.

Process 700 separates the new certificate from the rest of the response received in the manner of step 706 (step 708). Process 700 stores the new certificate, such as by writing the certificate to a certificate repository (step 710). Process 700 ends thereafter. In one embodiment, process 700 may use the new certificate for the secure data communication instead of, or in addition to, storing the new certificate in step 710.

In one embodiment, process 700 may be used to distribute renewed certificate to replace expired certificates. In another embodiment, process 700 may be used to trigger a forced renewal of a certificate, such as when a certificate has been revoked or has been flagged for revocation. As additional or modified steps, an implementation of process 700 may perform a clean-up of the certificate repository by removing the expired or expiring certificate upon receiving the new certificate.

With reference to FIG. 8, this figure depicts a flowchart of a process of using an indication in a request to distribute a certificate in accordance with an illustrative embodiment. Process 800 may be implemented in an application, such as application 308 in FIG. 3.

Process 800 begins by receiving a bind operation from a client (step 802). Process 800 receives an indication in the bind operation that suggests that the client has an ability to receive new certificate as a part of the bind operation (step 804). For example, a directory server may receive a control in an LDAP request for a bind operation from a directory client. The control may indicate that the directory client can accept a new certificate as a part of an LDAP response. A directory server implementing process 800 and receiving such a control from a directory client may determine in step 802 that the directory client can accept certificates included as a part of the LDAP response to the bind operation.

Furthermore, the directory server may also receive information in the LDAP request requesting a specific location, form, or identifier of the certificate in the response as described above. Such information may be included in the control or other indications in the LDAP request. In one embodiment, the indication or control may not be in the bind operation but in a different request-response pair used in a particular communication protocol. Accordingly, steps 802 and 804 may correspond to the particular request and indication being used, without departing from the scope of the illustrative embodiments.

Responsive to receiving the indication in step 804, process 800 may get a new certificate (step 806). In one embodiment, receiving such an indication in a request may cause a server to examine its own certificate and renew the certificate if needed. For example, upon receiving the control in a bind operation, the directory server may determine that its certificate is within a predetermined period from the end date and renew the certificate. In this manner, the indication from the client that the client is able to accept certificates as a part of the response may act as a notification of certificate expiration described with respect to FIGS. 5 and 6.

Process 800 may attach the new certificate according to the indication (step 808). For example, the certificate may occupy a specified location, follow a specified identifier, be a control, or be in a specified form, in the response. Process 800 sends the response to the client in response to the bind operation or other request in step 802 (step 810). Process 800 ends thereafter.

In one embodiment, process 800 may be used to distribute renewed certificate to replace expired or expiring certificates. In another embodiment, process 800 may be used to trigger a forced substitution of a certificate that would otherwise be valid but has been revoked or flagged for revocation. As additional or modified steps, an implementation of process 800 may also instruct the client to perform a clean-up and remove the expired or expiring certificate from its certificate repository.

With reference to FIG. 9, this figure depicts a flowchart of a process of distributing a certificate in a directory environment in accordance with an illustrative embodiment. Process 900 may be implemented in an application, such as application 308 in FIG. 3.

Process 900 begins by receiving a command from a client requesting a new certificate (step 902). In a directory environment, a directory server may receive the command using an extended operation. Process 900, responsive to the command, may get a new certificate (step 904). For example, in a directory server implementing process 900, the directory server may retrieve, examine, or request a new certificate, or perform a combination thereof, in step 904, such as described in step 806 in FIG. 8. Process 900 responds to the command with the new certificate (step 906). Process 900 ends thereafter.

In one embodiment, the response to an extended operation in a directory may be a response constructed specially for communicating certificates to directory clients that invoke the extended operation. Of course, such a response may include information other than just the new certificate.

The components in the block diagrams and the steps in the flowcharts and timing diagrams described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for certificate distribution using a one-way secure handshake or a two-way secure handshake. An application or a data processing system may receive a certificate from another application or data processing system in a secure handshake to establish a secure data communication. The application or data processing system receiving the certificate may be a client or a server. Correspondingly, the application or data processing system sending the certificate may be a server or a client.

In some instances, the secure handshake may include a bind operation, such as a bind operation in a directory. The secure handshake may also include other interactions for exchanging authentication information, encryption information, or other information before establishing a secure data communication. Any such form of secure handshake is contemplated within the scope of the illustrative embodiments for distributing certificates.

An application may send an indication during the secure handshake that the application is able to receive new certificate during the interactions of the secure handshake. Another application may receive the indication and provide the new certificate in an interaction during the secure handshake.

In a directory environment, a directory client may send a control in a bind operation as the indication. A directory server may send a new certificate back to the directory client in the form of a control as well. A directory client may also invoke an extended operation of a directory server requesting a new certificate. The directory server may respond to the extended operation with the new certificate included in a response.

Thus, the illustrative embodiments provide a method, system, and computer usable program product that may reduce or eliminate dependency on users for detecting certificate expiration, requesting new certificates, and distributing the new certificates. Illustrative embodiments may allow the detection of certificate expiration to occur automatically or without user intervention. The illustrative embodiments also allow for automatic renewal of expired or expiring certificates without user intervention.

The illustrative embodiments further allow for automatic distribution of the renewed certificates. The indication, the control, and the extended operation are examples of ways in which an application may demand a new certificate from another application. In this manner, the illustrative embodiments provide an automatic on-demand distribution of new certificates.

In replacing a certificate in this manner, a client may perform a clean-up of its certificate repository and remove the expired or expiring certificate from its certificate repository automatically when the client receives the new certificate. By using the illustrative embodiments in the manner described in this disclosure, a data processing environment can be kept functioning for secure data communications. The illustrative embodiments may also help in removing or reducing errors in a manual certificate distribution process.

Furthermore, by using the illustrative embodiments, a data processing environment can proactively replace certificates that may be compromised before their expiration. The illustrative embodiments can be used to force a replacement of a compromised certificate with a new certificate from the client or from the server. For example, a client can determine that the certificate has been revoked or flagged for revocation and send a notification to a server to trigger a certificate renewal process. As another example, the client can send an indication in a request that the client is ready to accept a new certificate in the manner described above. The server can then force a renewal upon detecting such an indication.

As an example, a server can replace a compromised certificate and send the new certificate when a client indicates that the client is ready to accept a new certificate. A server may also initiate a replacement of a revoked or compromised certificate in other ways using the illustrative embodiments. For example, the server can send a new certificate as a part of a response, such as in a control, and the client may be configured to separate the certificate and use the new certificate when the client receives a certificate in this manner. In replacing a certificate at a client in this manner, a server may instruct the client to perform a clean-up and remove the expired or expiring certificate from its certificate repository.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for certificate distribution, the computer implemented method comprising:
sending from a client to a server, using a processor and a memory, an indication in a request, the request being a part of a secure data communication to the server, wherein the indication is sent when an old certificate of the server is valid for use in the secure data communication with the server and a validity period of the old certificate of the server is set to elapse within a predetermined future period from a time of the secure data communication as determined by the client, the indication being a parameter in a defined structure of the request, the indication indicating an ability of the client to accept a replacement server certificate as a part of a response, and the indication causing an action to occur at the server with respect to the validity of server's old certificate;
receiving at the client, responsive to the indication, the replacement server certificate from the server in the response corresponding to the request;
separating the replacement server certificate from the response; and
using the replacement server certificate in the secure data communication.

2. The computer implemented method of claim 1, wherein the server is a directory operating using a lightweight directory access protocol (LDAP), and wherein the indication is a control in an LDAP request.

3. The computer implemented method of claim 2, wherein the LDAP request is a bind operation with the directory.

4. The computer implemented method of claim 1, wherein the server is a directory operating using LDAP, wherein sending the indication in the request is executing an operation, and the response is a result of executing the operation, the result including the replacement server certificate, wherein the replacement server certificate replaces the old certificate presented from the server during the secure data communication, wherein the directory forces the client to substitute the old certificate with the replacement server certificate, and wherein the directory instructs the client to remove the old certificate from a certificate repository used by the client.

5. The computer implemented method of claim 4, wherein the server is a directory operating using LDAP, and wherein the operation is an extended operation in the directory, and the result is a special response resulting from the extended operation.

6. The computer implemented method of claim 1, wherein the request is a part of a secure handshake.

7. The computer implemented method of claim 1, wherein sending the indication in the request is responsive to determining that the old certificate is revoked by a certificate authority.

8. The computer implemented method of claim 1, wherein sending the indication in the request is responsive to determining that the old certificate is flagged for revocation by a certificate authority.

9. The computer implemented method of claim 1, wherein the request is a part of a bind operation with the directory.

10. A computer implemented method for certificate distribution, the computer implemented method comprising:

receiving from a client at a server, using a processor and a memory, an indication in a request, the request being a part of a secure data communication to the server, wherein the indication is sent when an old certificate of the server is valid for use in the secure data communication with the server and a validity period of the old certificate of the server is set to elapse within a predetermined future period from a time of the secure data communication as determined by the client, the indication being a parameter in a defined structure of the request, the indication indicating an ability to accept a replacement server certificate as a part of a response, and the indication causing an action to occur at the server with respect to the validity of server's certificate;

retrieving the replacement server certificate at the server;

sending, responsive to the indication, the replacement server certificate to the client in the response corresponding to the request; and using the replacement server certificate in the secure data communication.

11. The computer implemented method of claim 10, wherein retrieving the replacement server certificate is one of (i) obtaining the replacement server certificate from a certificate authority, (ii) generating the replacement server certificate, and (iii) retrieving the replacement server certificate from a certificate repository, the replacement server certificate replacing an old certificate presented from the server during the secure data communication.

12. The computer implemented method of claim 10, wherein the server is a directory operating using a lightweight directory access protocol (LDAP), and wherein receiving the indication in the request is one of (i) receiving a control in an LDAP request, (iii) receiving a control in a bind operation, and (iv) receiving a command to execute an extended operation in the directory.

13. The computer implemented method of claim 10, wherein the indication indicates that an old server certificate presented from the server during the secure data communication is expired.

14. The computer implemented method of claim 10, wherein the server is a directory operating using a lightweight directory access protocol (LDAP), wherein the request is a part of one of (i) a secure handshake and (ii) a bind operation, and wherein the replacement server certificate replaces the old certificate presented from the server during the secure data communication, wherein the directory forces the client to substitute the old certificate with the replacement server certificate, and wherein the directory instructs the client to remove the old certificate from a certificate repository used by the client.

15. A computer usable program product comprising a computer usable storage device including computer usable code for certificate distribution, the computer usable code comprising:

computer usable code for sending from a client to a server an indication in a request, the request being a part of a secure handshake in a secure data communication to the server, wherein the indication is sent when an old certificate of the server is valid for use in the secure data communication with the server and a validity period of the old certificate of the server is set to elapse within a predetermined future period from a time of the secure data communication as determined by the client, the indication being a parameter in a defined structure of the request, the indication indicating an ability of the client to accept a replacement server certificate as a part of a response, and the indication causing an action to occur at the server with respect to the validity of server's certificate;

computer usable code for receiving at the client, responsive to the indication, the replacement server certificate from the server in the response corresponding to the request;

computer usable code for separating the replacement server certificate from the response; and computer usable code for using the replacement server certificate in the secure data communication.

16. The computer usable program product of claim 15, wherein the server is a directory operating using a lightweight directory access protocol (LDAP), and wherein the indication is a control in an LDAP request.

17. A data processing system for certificate distribution, the data processing system comprising:

a storage device, wherein the storage device stores computer usable program code; and a processor, wherein the processor executes the computer usable program code, and wherein the computer usable program code comprises:

computer usable code for sending from a client to a server an indication in a request, the request being a part of a secure handshake in a secure data communication to the server, wherein the indication is sent when an old certificate of the server is valid for use in the secure data communication with the server and a validity period of the old certificate of the server is set to elapse within a predetermined future period from a time of the secure data communication as determined by the client, the indication begin a parameter in a defined structure of the request, the indication indicating an ability of the client to accept a replacement server certificate as a part of a response, and the indication causing an action to occur at the server with respect to the validity of server's certificate;

computer usable code for receiving at the client, responsive to the indication, the replacement server certificate in the response corresponding to the request;

computer usable code for separating the replacement server certificate from the response; and computer usable code for using the replacement server certificate in the secure data communication.

18. The data processing system of claim 17, wherein the server is a directory operating using a lightweight directory access protocol (LDAP), and wherein the indication is a control in an LDAP request.

* * * * *